United States Patent
Shinyama et al.

(10) Patent No.: US 6,333,125 B1
(45) Date of Patent: Dec. 25, 2001

(54) NON-SINTERED NICKEL ELECTRODE FOR ALKALINE STORAGE CELL, AND ALKALINE STORAGE CELL UTILIZING THE ELECTRODE

(75) Inventors: Katsuhiko Shinyama, Higashiosaka; Yoshinori Matsuura, Hirakata; Reizo Maeda, Hirakata; Ikuo Yonezu, Hirakata; Koji Nishio, Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/290,872

(22) Filed: Apr. 14, 1999

(30) Foreign Application Priority Data

Apr. 16, 1998 (JP) .................................. 10-106351

(51) Int. Cl.$^7$ ............................. H01M 4/32; H01M 4/50; H01M 4/58
(52) U.S. Cl. ......................... 429/223; 429/224; 429/229
(58) Field of Search .................................. 429/223, 224, 429/229

(56) References Cited

U.S. PATENT DOCUMENTS

| | | | |
|---|---|---|---|
| 4,224,133 | * 9/1980 | Takahasi | 204/290 R |
| 5,478,674 | * 12/1995 | Miyasaka | 429/218 |
| 5,487,960 | * 1/1996 | Tanaka | 429/218 |
| 5,506,076 | * 4/1996 | Miyamoto et al. | 429/223 |
| 5,654,115 | * 8/1997 | Hasebe et al. | 429/218 |
| 5,708,349 | * 1/1998 | Hasebe et al. | 320/21 |
| 6,033,807 | * 3/2000 | Yasuda | 429/231.95 |
| 6,060,195 | * 5/2000 | Shinyama et al. | 429/223 |

FOREIGN PATENT DOCUMENTS

| | | | |
|---|---|---|---|
| 777417 | 6/1957 | (GB) . | |
| 405021064 | * 1/1993 | (JP) | H01M/4/52 |

OTHER PUBLICATIONS

Oshitani et al., "Development of a Pasted Nickel Electrode with High Active Material Utilization"; J. Electrochem. Soc., vol. 136, No. 6, Jun. 1989, 1590–1593.

Wang et al., "Electrochemical Characteristics of Nickel Hydroxide Modified by Electroless Cobalt Coating"; Int. J. Hydrogen Energy, vol. 23, No. 10, pp. 873–878, 1998.

Wang et al., "Surface Modification and Electrochemical Studies of Spherical Nickel Hydroxide"; Journal of Power Source 72 (1998) 221–225.

Nickel Electrode for Alkaline Cell; Abstract of JP 62-234867 (Oct., 1987).

Paste Type Nickel Electrode for Alkaline Storage Battery; 3–14758 (A) (Jun. 1991).

* cited by examiner

Primary Examiner—Steven P. Griffin
Assistant Examiner—Jonas N. Strickland
(74) Attorney, Agent, or Firm—Armstrong, Westerman, Hattori, McLeland & Naughton LLP

(57) ABSTRACT

In a non-sintered nickel electrode for an alkaline storage cell, a discharge capacity and cycle life are improved. This is achieved by employing, as an active material for the non-sintered electrode, coated nickel active material particles, each of the particle comprising a base particle composed of nickel hydroxide and a Co—P—A layer coated on the base particle comprising Co and P and an element A, where A is at least one element selected from the group consisting of Mn, Zn, Ni, Y, and Bi.

16 Claims, No Drawings

NON-SINTERED NICKEL ELECTRODE FOR ALKALINE STORAGE CELL, AND ALKALINE STORAGE CELL UTILIZING THE ELECTRODE

BACKGROUND OF THE INVENTION (1) Field of the Invention

The present invention relates to a non-sintered nickel electrode for use in an alkaline storage cell such as a nickel-hydrogen storage cell, a nickel-cadmium storage cell. The present invention also relates to an alkaline storage cell utilzing the electrode.

(2) Description of the Prior Art

In impregnating an active material into a substrate, a non-sintered substrate generally makes it possible to achieve a higher impregnating density, in comparison with a sintered substrate. However, when a porosity of the substrate is raised in order to increase the impregnating density, the proportion of the active material being not immediately in contact with the substrate is increased, and therefore the current collection efficiency of the substrate is degraded, inducing the decrease of an active material utilization rate. Thus, even if the impregnating density is increased in impregnating an active material using a substrate with a large porosity, an actual capacity of a cell cannot be sufficiently increased. In view of such a problem, Japanese Unexamined Patent Publication No. 3-147258 discloses such a technique that, for a non-sintered nickel electrode, a plated layer of cobalt is formed on the surface of an active material consisting of nickel hydroxide. According to this technique, since the cobalt layer formed on the surface of nickel hydroxide enhances the conductivity between the active material particles, the active material utilization rate of the electrode is improved, resulting in an increase of a discharge capacity.

However, in course of the rapid development of mobile electronic devices and the like, there is a growing need for a cell having a higher energy density and a longer cycle life. In consideration of such circumstances, there is still an ample room for improvement in the technique described above. In particular, a short cycle life of the cell still lies as a problem.

SUMMARY OF THE INVENTION

The present invention has been accomplished in view of the problems as described above. It is therefore an object of the present invention to provide a non-sintered nickel electrode for an alkaline storage cell in which an active material utilization rate is rendered high and a deterioration of a discharge capacity is suppressed.

It is another object of the present invention to provide a high-performance alkaline storage cell utilizing such a non-sintered nickel electrode.

These and other objects are accomplished, in one aspect of the invention, by the provision of a non-sintered nickel electrode for use in an alkaline storage cell comprising a porous substrate and coated nickel active material particles impregnated in the porous substrate, each of the coated nickel particles comprising, a base particle comprising nickel hydroxide, and a Co—P—A layer coated on a surface of the base particle, the Co—P—A layer consisting of Co, P, and an element A, where A is at least one element selected from the group consisting of Mn, Zn, Ni, Y, and Bi.

According to this construction, the discharge capacity of a non-sintered nickel electrode is increased and the cycle life is remarkably improved. The reasons are considered to be as follows.

Firstly, in a cell according to the above construction, Co (cobalt) in the Co—P—A layer serves to increase the electrical conductivity between the coated nickel active material particles. As a result, an active material utilization rate is increased along with a current collection efficiency in the electrode. Secondly, P (phosphorus) serves to prevent the coating layer (the Co—P—A layer) from becoming a crystalline layer which is dense. If the coating layer is a dense and crystalline layer, the permeation of the electrolyte solution is hindered and thereby the electrochemical reaction of the nickel hydroxide in the base particle is hindered. On the other hand, when the coating layer is an amorphous layer, such hindrance of the electrochemical reaction does not occur. Moreover, since the Co—P—A layer shows an excellent electrical conductivity, a charge-discharge reaction is smoothly proceeded and as a result a discharge capacity is remarkably increased.

Thirdly, the element A (at least one element selected from the group consisting of Mn, Zn, Ni, Y, and Bi) serves to suppress the expansion of the nickel active material. Therefore, a capacity decrease caused by a dryout of a separator (i.e., a phenomenon in which an electrolyte solution permeates into the expanded crystal lattices of nickel hydroxide) is suppressed, and thereby the degradation of a cycle life is suppressed.

Hence, according to the construction described above, a non-sintered nickel electrode having a high discharge capacity and a long cycle life is achieved.

In addition, in the above-described construction, the element A in the Co—P—A layer may be at least one element selected from the group consisting of Zn (zinc) and Mn (manganese). That is, the Co—P—A layer may be a Co—P—Zn layer, or a Co—P—Mn layer, or a Co—P—Zn—Mn layer. According to this construction, the discharge capacity and the cycle life of the electrode are further improved, although the cause is not yet fully understood.

In addition, in the above-described construction, the amount of the formed Co—P—A layer may be 1–20 wt % based on the weight of the coated nickel particles. When the amount of the formed coating layer is within the above range, the effect of improving the electrical conductivity by the formation of the Co—P—A layer (which is an advantageous effect) surpasses the effect by the relative decrease of the amount of nickel hydroxide serving as an active material (which is an adverse effect), and therefore, the discharge capacity and the cycle life are both improved.

In addition, in the above-described construction, the Co—P—A layer may be a sodium-containing Co—P—A layer in which sodium is contained. According to this construction, the electrical conductivity of the coated nickel active material particle is further improved, and thereby the discharge capacity is remarkably increased, although the cause is not yet identified.

In addition, in the above-described construction, the Co—P—A layer may be formed by an electroless plating. The Co—P—A layer formed by an electroless plating is made to be appropriately dense and uniform to such a degree that the layer does not hinder the permeation of an electrolyte solution, and therefore, the electrochemical reaction of nickel hydroxide as an active material is smoothly proceeded.

In addition, in the above-described construction, the Co—P—A layer may be an amorphous layer. When the Co—P—A layer is an amorphous layer, the electrochemical reaction of nickel hydroxide constituting the base particle is smoothly proceeded because a contact of nickel hydroxide and an electrolyte solution is not hindered.

A non-sintered nickel electrode for an alkaline storage cell in accordance with the construction described above may be produced, in accordance with another aspect on the invention, by a method of producing a non-sintered nickel electrode for an alkaline storage cell, the non-sintered nickel electrode comprising a porous substrate and coated nickel active material particles impregnated in the substrate, the method comprising at least the steps of:

producing a base particle comprising nickel hydroxide, and electroless-plating to form a Co—P—A layer on a surface of the base particle by using an electroless plating bath, the Co-P-A layer comprising Co, P, and an element A, where the element A is at least one element selected from the group consisting of Mn, Zn, Ni, Y, and Bi.

The above producing method may comprise a step of adding sodium in the Co—P—A layer to form sodium-containing nickel particles, by adding sodium hydroxide to the coated nickel particles produced in the step of electroless-plating and thereafter heating the coated nickel particles. According to this construction, sodium can be readily added in the coating layer, and thereby the electrical conductivity of the coated particle is further increased.

In the method described above, the element A in the Co—P—A layer may be at least one element selected from the group consisting Zn and Mn, and the electroless plating bath may contain a cobalt compound for a Co component in the Co—P—A layer, a phosphorus compound for a P component in the Co—P—A layer, and a zinc compound and/or a manganese compound for an A component in the Co—P—A layer. It is noted that the electroless plating is preferable since the coating layer can be formed on each individual base particle and the resulting coating layer is rendered uniform.

In the method described above, it is preferable that a pH of the electroless plating bath be between pH 7 and pH 8, and a temperature of said electroless plating bath be between 80° C. and 90° C. When the conditions of the electroless plating are such, the components of the coating layer are coated on the surface of the base particle with high efficiency.

Such non-sintered nickel electrode as described above can be suitably used for a positive electrode for an alkaline storage cell. That is, an alkaline storage cell may be constructed with the use of the above-described non-sintered nickel electrode for a positive electrode, a known electrode, such as a hydrogen-absorbing alloy electrode and cadmium electrode, for a negative electrode, and a known alkaline electrolyte solution such as potassium hydroxide. An alkaline storage cell thus constructed exhibits a far larger discharge capacity and improved cycle characteristics in comparison with an alkaline storage cell utilizing a sintered nickel electrode or a prior art non-sintered nickel electrode.

DESCRIPTION OF THE PREFERRED EMBODIMENTS

Now, the present invention is detailed on the basis of the examples described below. For the sake of the convenience in description, the examples are divided into two groups, the first example group and the second example group. Examples 1 to 9 and a Comparative Example are explained in the first example group, and Example 10 to 17 are explained in the second example group.

The First Example Group

In the first example group, a composition of a coating layer to be formed on the surface of a nickel hydroxide particle is varied. By the description of the first example group, the relationship between the composition of the coating layer and the performance of a cell is illustrated.

EXAMPLE 1

Now, Example 1 of the present invention is described by following the production processes of a cell, namely, preparation of an active material, preparation of electrodes, and preparation of an alkaline storage cell.

(1) Preparation of An Active Material

Nickel hydroxide particles in which 3 wt % of zinc (Zn) and 0.75 wt % of cobalt (Co) are comprised in a state of a solid solution (the particles are hereinafter referred to as 'base particles'), were subjected to a plating eaction for minutes using an electroless plating bath having a composition shown in the Table 1 below. The plating was carried out under the condition in which the pH of the plating bath was adjusted to be pH 7 with sodium hydroxide, and the plating bath was heated and then kept at 90° C. As the result of this electroless plating reaction, coated particles A each in which the surface of the base particle is coated with a Co—Zn—P layer were obtained. The coated particles A were analyzed by atomic absorption spectroscopy, and as the result, it was found that a ratio of Co:Zn:P in the Co—Zn—P layer was 91:5:4, and the proportion of the Co—Zn—P layer based on the weight of the coated nickel particles was 10 wt %. In addition, an X-ray diffraction analysis of the coated particles A revealed that the Co—Zn—P layer was an amorphous layer.

Although the pH of the plating bath was adjusted at pH 7 in the plating step described above, the pH of the plating bath may be adjusted at about pH 8. However, when the pH of the plating bath is made to be higher, the rate of the reaction is rendered excessively high and thereby it becomes difficult to control a uniformity of the coating layer. In consideration of this problem, it is preferable that the rate of the reaction be controlled by, for example, lowering each of the concentrations of the components in the plating bath, or the like method. In addition, the temperature of the plating bath is not restricted to be 90° C. as mentioned above. However, in order to appropriately carry out the plating reaction, it is preferable that the temperature of the plating bath be within the range of 60° C.–90° C., more preferably be within the range of 80° C.–90° C. It is noted here that the 'electroless plating' (chemical plating) herein is intended to mean a plating method utilizing an anodic oxidation of a reducing agent without using external electric power supplies.

TABLE 1

| Bath Composition | Substance | Concentration (mol · dm$^{-3}$) |
|---|---|---|
| Component for forming a Co—P—A layer | $CoSO_4$ | 0.05 |
| | $ZnSO_4$ | 0.0025 |
| | $NaH_2PO_2$ | 0.2 |
| Component for Facilitating Plating Treatment (Additives) | $C_3H_4OH(COONa)_3$ | 0.2 |
| | $H_3BO_3$ | 0.5 |

(2) Preparation of Electrodes

Firstly, a paste was prepared by mixing 100 parts by weight of the above-described nickel particles A (the average particle diameter: 10 μm) and 20 parts by weight of a 1 wt % methylcellulose aqueous solution. Thereafter, the paste was impregnated in a porous foamed nickel material (porous substrate) with a porosity of 95 wt % and an average pore diameter of 200 μm. Subsequently, the substrate was dried, and then press-formed. A non-sintered nickel electrode in accordance with the present invention was thus prepared.

(3) Preparation of An Alkaline Storage Cell

In preparing an electrode assembly, the above non-sintered nickel electrode was employed as a positive electrode, and a known paste type cadmium electrode having an electrochemical capacity larger than that of the positive electrode was employed as a negative electrode. These electrodes were wound with a separator made of polyamide non-woven fabric interposed therebetween to form an electrode assembly. This electrode assembly and a 30 wt % potassium hydroxide aqueous solution (an alkaline electrolyte solution) were enclosed into a metal cell can having a shape like a bottom-sealed cylinder, and the opening of the cell can was sealed with a metal cell lid provided with a safety valve. An AA size alkaline storage cell, having a diameter of 14.5 mm and a height of 50.5 mm, in accordance with the present invention (theoretical capacity: approx. 850 mAh) was thus prepared.

EXAMPLE 2

The coated nickel particles A having the Co—Zn—P layer, made in accordance with the above Example 1, and a 35 wt % sodium hydroxide aqueous solution were mixed with a weight ratio of 1:10. Thereafter, the resulting mixture was heated at 80° C. for 8 hours, then washed with water, and dried at 60° C. Thereby, sodium-containing coated nickel particles B, in which sodium was contained in the Co—Zn—P layer, were obtained.

Except that the sodium-containing coated nickel particles B were used in place of the coated nickel particle A, an alkaline storage cell B1 in accordance with the present invention was prepared in the same manner as in the above Example 1.

A sodium content rate in the sodium-containing coated nickel particles was analyzed by using atomic absorption spectroscopy, and the rate was found to be 8 wt % based on the weight of the cobalt in the Co—Zn—P layer.

It is to be noted here that the sodium contents and the proportions of the elements in the coated layer set forth hereinbefore and hereinafter are the results obtained by atomic absorption spectroscopy.

EXAMPLE 3

Coated nickel particles C, in which the surface of each base particle was coated with a Co—Mn—P layer, was prepared in the same manner as in the above Example 1 except that manganese sulfate ($MnSO_4$) was employed in place of $ZnSO_4$ in the forming components of the Co—P—A layer described in the above Table 1, and that the concentration was made to be 0.0012 mole·$dm^{-3}$. A nickel electrode and an alkaline storage cell C1 in accordance with the present invention were prepared in the same manner as in the above Example 1 except that the coated nickel particles C were used in place of the coated nickel particles A.

The weight ratio of Co:Mn:P in the Co—Mn—P layer in the above coated nickel particles C was 94:2:4, and the amount of the formed Co—Mn—P layer based on the weight of the coated nickel particles was 10 wt %. It is noted that 'mol·$dm^{-3}$' herein is used as the same unit as 'mol/l (liter)'.

EXAMPLE 4

Sodium-containing coated nickel particles D, in which sodium is contained in the Co—Mn—P layer, were prepared in the same manner as in the above Example 2 except that the same coated nickel particles C as in the above Example 3 were used in place of the coated nickel particle A. Then, a nickel electrode and an alkaline storage cell D1 in accordance with the present invention were prepared using the sodium-containing coated nickel particles D.

The sodium content rate in the sodium-containing coated nickel particles D was 8 wt % based on the weight of the cobalt in the Co—Mn—P layer.

EXAMPLE 5

Except that both zinc sulfate ($ZnSO_4$) with a concentration of 0.0025 mol·$dm^{-3}$ and manganese sulfate $MnSO_4$) with a concentration of 0.0012 mol·$dm^{-3}$ were used in place of the $ZnSO_4$ with a concentration of 0.0025 mol·$dm^{-3}$ in the forming components of the Co—P—A layer as in the Table 1, a Co—Zn—Mn—P layer was formed on the surface of each nickel hydroxide particle, which was the base particle, in the same manner as in the above Example 1. Coated nickel particles E were thus prepared. A nickel electrode and an alkaline storage cell E1 in accordance with the present invention were prepared in the same manner as in the above Example 1 except that the coated nickel particles E were used in place of the coated nickel particles A.

The weight ratio of Co:Zn:Mn:P in the Co—Zn—Mn—P layer in the above coated nickel particles E was 89:5:2:4, and the amount of the formed Co—Zn—Mn—P layer based on the weight of the coated nickel particles was 10 wt %.

EXAMPLE 6

Sodium-containing coated nickel particles F, in which sodium is contained in the Co—Zn—Mn—P layer, were prepared in the same manner as in the above Example 2 except that the same coated nickel particles E as produced in the above Example were used in place of the coated nickel particles A. Thereafter, a nickel electrode and an alkaline storage cell F1 in accordance with the present invention were prepared using the sodium-containing coated nickel particles F.

The sodium content rate in the sodium-containing coated nickel particles F was 8 wt % based on the weight of the cobalt in the Co—Zn—Mn—P layer.

EXAMPLE 7

Coated nickel particles G in which the surface of nickel hydroxide was coated with a Co—Ni—P layer was prepared in the same manner as in the above Example 1 except that nickel sulfate ($NiSO_4$) with a concentration of 0.0028 mol·$dm^{-3}$ was used in place of zinc sulfate used in Example 1.

The weight ratio of Co:Ni:P in the Co—Ni—P layer in the above coated nickel particles G was 91:5:4, and the amount of the formed Co—Ni—P layer based on the weight of the coated nickel particles was 10 wt %.

A nickel electrode and an alkaline storage cell G1 in accordance with the present invention was prepared in the same manner as in the above Example 1 except that the coated nickel particles G were used in place of the coated nickel particles A.

EXAMPLE 8

Coated nickel particles H in which the surface of nickel hydroxide was coated with a Co—Y—P layer was prepared in the same manner as in the above Example 1 except that yttrium sulfate octo-hydrate ($Y_2(SO_4)_3 \cdot 8H_2O$) with a concentration of 0.00035 mole·dm$^{-3}$ was used in place of zinc sulfate used in Example 1.

The weight ratio of Co:Y:P in the Co—Y—P layer in the above coated nickel particles H was 94:2:4, and the amount of the formed Co—Y—P layer based on the weight of the coated nickel particles was 10 wt %.

A nickel electrode and an alkaline storage cell H1 in accordance with the present invention was prepared in the same manner as in the above Example 1 except that the coated nickel particles H were used in place of the coated nickel particles A.

EXAMPLE 9

Coated nickel particles I in which the surface of nickel hydroxide was coated with a Co—Bi—P layer was prepared in the same manner as in the above Example 1 except that bismuth sulfate ($Bi_2(SO_4)_3$) with a concentration of 0.0028 mole·dm$^{-3}$ was used in place of zinc sulfate used in Example 1.

The weight ratio of Co:Bi:P in the Co—Bi—P layer in the above coated nickel particles I was 94:2:4, and the amount of the formed Co—Bi—P layer based on the weight of the coated nickel particles was 10 wt %.

A nickel electrode and an alkaline storage cell I1 in accordance with the present invention was prepared in the same manner as in the above Example 1 except that the coated nickel particles I were used in place of the coated nickel particles A.

Comparative Example

Coated nickel particles X, in which the surface of nickel hydroxide is coated with a Co—P layer, were prepared in the same manner as in the above Example 1 except that zinc sulfate ($ZnSO_4$), a forming component of the element A used in the above Example 1, was not used.

The weight ratio of Co:P in the Co—P layer in the above coated nickel particles X was 96:4, and the amount of the formed Co—P layer based on the weight of the coated nickel particles was 10 wt %.

A nickel electrode and an alkaline storage cell X1 of the Comparative Example were prepared in the same manner as in the above Example 1 except that the coated nickel particles X were used in place of the coated nickel particles A. It is to be noted that this storage cell X1 was made in accordance with the technique disclosed in the Japanese Unexamined Patent Publication No. 3-147258, mentioned previously as prior art.

Regarding the cells A1 through I1 in accordance with the above Examples 1 through 9, and the cell X1 of the Comparative Example, Table 2 below shows the compositions of the elements composing the coating layers of the coated nickel particles, the materials used for forming the coating layers, and whether sodium is contained therein or not.

TABLE 2

|  | Cell | Composition of A Coating Layer | Component for Forming A Coating Layer | Inclusion of Na |
|---|---|---|---|---|
| Example 1 | Cell A1 | Co—Zn—P | $ZnSO_4$ | — |
| Example 2 | Cell B1 | Co—Zn—P | $ZnSO_4$ | Contained |
| Example 3 | Cell C1 | Co—Mn—P | $MnSO_4$ | — |

TABLE 2-continued

|  | Cell | Composition of A Coating Layer | Component for Forming A Coating Layer | Inclusion of Na |
|---|---|---|---|---|
| Example 4 | Cell D1 | Co—Mn—P | $MnSO_4$ | Contained |
| Example 5 | Cell E1 | Co—Zn—Mn—P | $ZnSO_4$, $MnSO_4$ | — |
| Example 6 | Cell F1 | Co—Zn—Mn—P | $ZnSO_4$, $MnSO_4$ | Contained |
| Example 7 | Cell G1 | Co—Ni—P | $NiSO_4$ | — |
| Example 8 | Cell H1 | Co—Y—P | $Y_2(SO_4)_3 \cdot 8H_2O$ | — |
| Example 9 | Cell I1 | Co—Bi—P | $Bi_2(SO_4)_3$ | — |
| Comparative Example | Cell X1 | Co—P | — | — |

It is to be noted that, among the components for forming the coating layer, cobalt sulfate ($CoSO_4$) and sodium hypophosphite ($NaH_2PO_2$) were employed in all the Examples 1 through 9 and the Comparative Example. For this reason, cobalt sulfate and sodium hypophosphite are not shown in the above Table 2.

Evaluation of the Cells

The above-described cells A1 through I1 and the Comparative Example cell X1 were subjected to an evaluation test under the conditions set forth below, in order to examine their discharge capacities and cycle lives.

(1) Discharge Capacity

Each subjected cell was charged with 100 mA at 25° C. for 16 hours, and thereafter discharged with 100 mA at 25° C. until the cell voltage became 1.0 V. This charge-discharge cycle was repeated cycles, and at the 11th cycle, the cell was charged with 100 mA at 25° C. for 16 hours and discharged with 1000 mA at 25° C. until the cell voltage became 1.0 V. The discharge capacity of each cell was measured at this 11th cycle.

(2) Cycle Life

Each subjected cell was charged with 1000 mA at 25° C. for 1.2 hours, and thereafter discharged with 1000 mA at 25° C. until the cell voltage became 1.0 V. This charge-discharge cycle was repeated until the discharge capacity of the subjected cell reached 60% of the above-described discharge capacity of the cell at the 11th cycle, and the number of the repeated cycles was defined to be the cycle life of the subjected cell.

The results of each of the cells obtained according to the above conditions are shown in Table 3 below.

TABLE 3

| Cell | Discharge Capacity (mAh) | Cycle Life (times) |
|---|---|---|
| Cell A1 | 940 | 1000 |
| Cell B1 | 960 | 900 |
| Cell C1 | 990 | 800 |
| Cell D1 | 1000 | 700 |
| Cell E1 | 970 | 950 |
| Cell F1 | 980 | 850 |
| Cell G1 | 920 | 650 |
| Cell H1 | 930 | 600 |
| Cell I1 | 930 | 650 |
| Cell X1 | 900 | 500 |

From the above Table 3, it is recognized that all the cells A1 through I1 of the present invention have larger discharge capacities and longer cycle lives than those of the cell X1 of the Comparative Example.

In addition, the cells A1 to F1, which contain both or either of zinc and manganese in the coating components, have even superior discharge capacities and cycle lives to the cells G1 to I1, which contain the elements other than zinc and manganese.

From the comparisons of the cells A1 and B1, the cells C1 and D1, and the cells E1 and F1, it is understood that a discharge capacity is further improved by including sodium in the coating layer.

From the results described thus far, it is proved that a discharge capacity and a cycle life of an electrode are increased by, in an active material of a non-sintered nickel electrode, forming a Co—P—A layer (where A is at least one element selected from the group consisting of Mn, Zn, Ni, Y, and Bi) on the surface of a nickel hydroxide particle. It is also proved that it is preferable to employ both or either of Zn and Mn for an element A in the Co—P—A layer. It is also proved that, it is preferable that sodium be contained in the Co—P—A layer to further improve a discharge capacity of an electrode.

The Second Example Group

In the second example group (Example 10 through 17), 8 types of cells J11 through J18 were prepared, and the amount of the formed Co—P—A layer based on the weight of the coated nickel particles was varied in each of the cells.

More specifically, 8 types of coated nickel particles J1 through J8 each having an amount of the Co—Zn—Mn—P layer (wt % based on the weight of the coated nickel particles) different from each other, were prepared by varying the treatment time of the electroless plating as shown in Table 4 below, and making the other conditions the same as the above Example 6. Using these coated nickel particles, non-sintered nickel electrodes were prepared in the same manner as in the first example group, and using these nickel electrodes, the alkaline storage cells J11 to J18 were prepared.

The discharge capacities and cycle lives of the cells J11 to J18 were measured in the same manner as in the first example group. The influence of the amount of the formed Co—Zn—Mn—P layer upon characteristics of a cell was elucidated from the results of the measurement.

Table 4 below shows the preparing conditions of the coated nickel particles and the results of the measurement regarding the cells J11 through J18 along with those of the cell X1 of the Comparative Example. It is noted that the amounts of the coating layers in the second example group were as shown in Table 4 below, and the weight ratio of the elements in the Co—Zn—Mn—P layer was the same in all the cells in the second example group (Co:Zn:Mn:P= 89:5:2:4).

TABLE 4

| Cell | Treatment Time (min.) | Amount of Coating Layer (wt %) | Discharge Capacity (mAh) | Cycle Life (times) |
| --- | --- | --- | --- | --- |
| Cell J11 (Example 10) | 0.4 | 0.5 | 800 | 800 |
| Cell J12 (Example 11) | 0.7 | 0.8 | 830 | 810 |
| Cell J13 (Example 12) | 1.0 | 1.0 | 900 | 830 |
| Cell J14 (Example 13) | 5.0 | 5.0 | 940 | 840 |
| Cell F1 | 10.0 | 10.0 | 980 | 850 |

TABLE 4-continued

| Cell | Treatment Time (min.) | Amount of Coating Layer (wt %) | Discharge Capacity (mAh) | Cycle Life (times) |
| --- | --- | --- | --- | --- |
| (Example 6, First Example group) | | | | |
| Cell J15 (Example 14) | 16.0 | 15.0 | 940 | 850 |
| Cell J16 (Example 15) | 22.0 | 20.0 | 900 | 850 |
| Cell J17 (Example 16) | 24.0 | 22.0 | 830 | 850 |
| Cell J18 (Example 17) | 27.0 | 25.0 | 790 | 850 |
| Cell X1 (Comparative Example) | 10.0 | 10.0 | 900 | 500 |

From Table 4, it is recognized that the cells J11 and J12, in which the amount of the Co—Zn—Mn—P layer is 0.5–0.8 wt % based on the weight of the coated nickel particles, and the cells J17 and J18, in which the amount of the Co—Zn—Mn—P layer is 22.0–25.0 wt %, exhibit longer cycle lives but smaller discharge capacities than those of the Comparative Example, in which the amount of the coating layer is 10 wt %. On the other hand, the cells J3 through J6, in which the amount of the coating layer is 1–20 wt %, exhibit longer cycle lives than the Comparative Example, and also show the discharge capacities equal to or larger than the Comparative Example.

From the above results, it is concluded that it is preferable that the amount of the formed coating layer in the coated nickel particles be 1–20 wt % based on the weight of the coated nickel particles.

In the above results, when the amount of the coating layer was less than 1 wt %, the discharge capacity was rendered small. The reason is considered to be that the thickness of the conductive layer on the surface of the particles is rendered too small to sufficiently conduct electricity between the particles. Likewise, when the amount of the coating layer was more than 20 wt %, the discharge capacity was also rendered small. This is considered to be because the amount of nickel hydroxide, which serves as an active material, is decreased corresponding to the increase of the amount of the coating layer, and thereby the power generating capability in the whole active material particles is degraded.

Although, in the above examples, the ratio of cobalt (Co) and the element A and phosphorus (P) in the coating layer was fixed, it is preferable that the ratio of the elements be kept within a certain range in order to efficiently improve an active material utilization rate and cycle characteristics. More specifically, it is preferable that the total amount of the element A and phosphorus (P) be 30 wt % or less, and the amount of cobalt be 70 wt % or more.

If the amount of cobalt in the coating layer is less than 70 wt %, the electrical conductivity is rendered insufficient. Moreover, an adverse effect caused by the relative decrease of the amount of cobalt, that is, the degradation of power generating capability, cannot be compensated by the increase of the element A and phosphorus because the advantageous effects by the element A and phosphorus reach a maximum level before the total amount of the element A and phosphorus reaches 30 wt %.

As has been described thus far, according to the present invention, a non-sintered nickel electrode having a large discharge capacity and excellent cycle life is achieved, and by utilizing the electrode, the cell performance of an alkaline storage cell can be remarkably improved.

Although the present invention and its advantages have been described in detail by way of example, it should be understood that various changes, modifications, and alterations can be made herein without departing from the spirit and scope of the invention as defined by the appended claims.

What is claimed is:

1. A non-sintered nickel electrode for use in an alkaline storage cell comprising a porous substrate and coated nickel particles for an active material impregnated in said porous substrate, each of said coated nickel particles comprising:

a base particle comprising nickel hydroxide, and a Co—P—A layer coated on a surface of said base particle, the Co—P—A layer comprising Co, P, and an element A, where A is at least one element selected from the group consisting of Mn, Zn, Ni, Y, and Bi.

2. A non-sintered nickel electrode for an alkaline storage cell according to claim 1, in which said element A in the Co—P—A layer is at least one element selected from the group consisting of Zn and Mn.

3. A non-sintered nickel electrode for an alkaline storage cell according to claim 2, in which an amount of the formed Co—P—A layer is between 1 and 20 wt % based on the weight of the coated nickel particles.

4. A non-sintered nickel elect rode for an alkaline storage cell according to claim 3, in which said Co—P—A layer contains sodium.

5. A non-sintered nickel electrode for an alkaline storage cell according to claim 4, in which said Co—P—A layer is formed by an electroless plating.

6. A non-sintered nickel electrode for an alkaline storage cell according to claim 5, in which said Co—P—A layer is an amorphous layer.

7. A non-sintered nickel electrode for an alkaline storage cell according to claim 1, in which an amount of the Co—P—A layer formed in the coated nickel particle is within the range of 1 wt % to 20 wt % based on the weight of the coated nickel particles.

8. A non-sintered nickel electrode for an alkaline storage cell according to claim 1, in which said Co—P—A layer contains sodium.

9. A non-sintered nickel electrode for an alkaline storage cell according to claim 1, in which said Co—P—A layer is formed by an electroless plating.

10. A non-sintered nickel electrode for an alkaline storage cell according to claim 1, in which said Co—P—A layer is an amorphous layer.

11. An alkaline storage cell comprising a non-sintered nickel electrode according to any one of claims 1 to 10, a negative electrode, and an alkaline electrolyte.

12. A method of producing a non-sintered nickel electrode for an alkaline storage cell, said non-sintered nickel electrode comprising a porous substrate and coated nickel particles for an active material impregnated in the substrate, the method comprising at least the steps of:

producing a base particle comprising nickel hydroxide, electroless-plating to form a Co—P—A layer on a surface of said base particle by using an electroless plating bath, the Co—P—A layer comprising Co, P, and an element A, where the element A is at least one element selected from the group consisting of Mn, Zn, Ni, Y, and Bi.

13. A method of producing a non-sintered nickel electrode according to claim 12, further comprising a step of adding sodium in the Co—P—A layer to form sodium-containing nickel particles, by adding sodium hydroxide to the coated nickel particles produced in the step of electroless-plating and thereafter heating the coated nickel particles.

14. A method of producing a non-sintered nickel electrode according to claim 12, in which:

said element A in the Co—P—A layer is at least one element selected from the group consisting Zn and Mn, and said electroless plating bath contains a cobalt compound for a Co component in the Co—P—A layer, a phosphorus compound for a P component in the Co—P—A layer, and a zinc compound and/or a manganese compound for an A component in the Co—P—A layer.

15. A method of producing a non-sintered nickel electrode according to claim 14, in which a pH of said electroless plating bath is between pH 7 and pH 8, and a temperature of said electroless plating bath is between 80° C. and 90° C.

16. A method of producing a non-sintered nickel electrode according to claim 15, further comprising a step of adding sodium in the Co—P—A layer to form sodium-containing nickel particles, by adding sodium hydroxide to the coated nickel particles produced in the step of electroless-plating and thereafter heating the coated nickel particles.

* * * * *